Patented Dec. 22, 1931

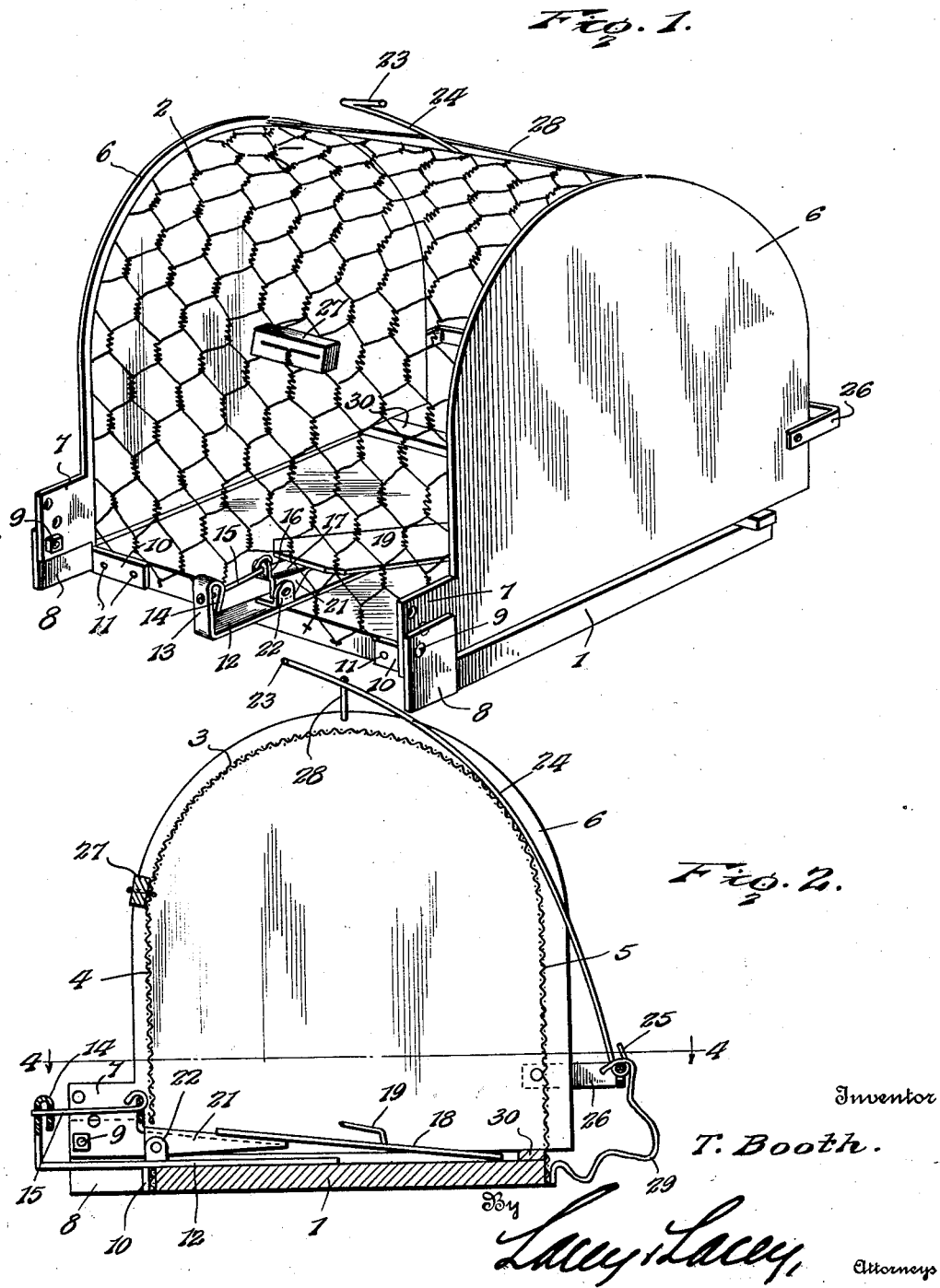

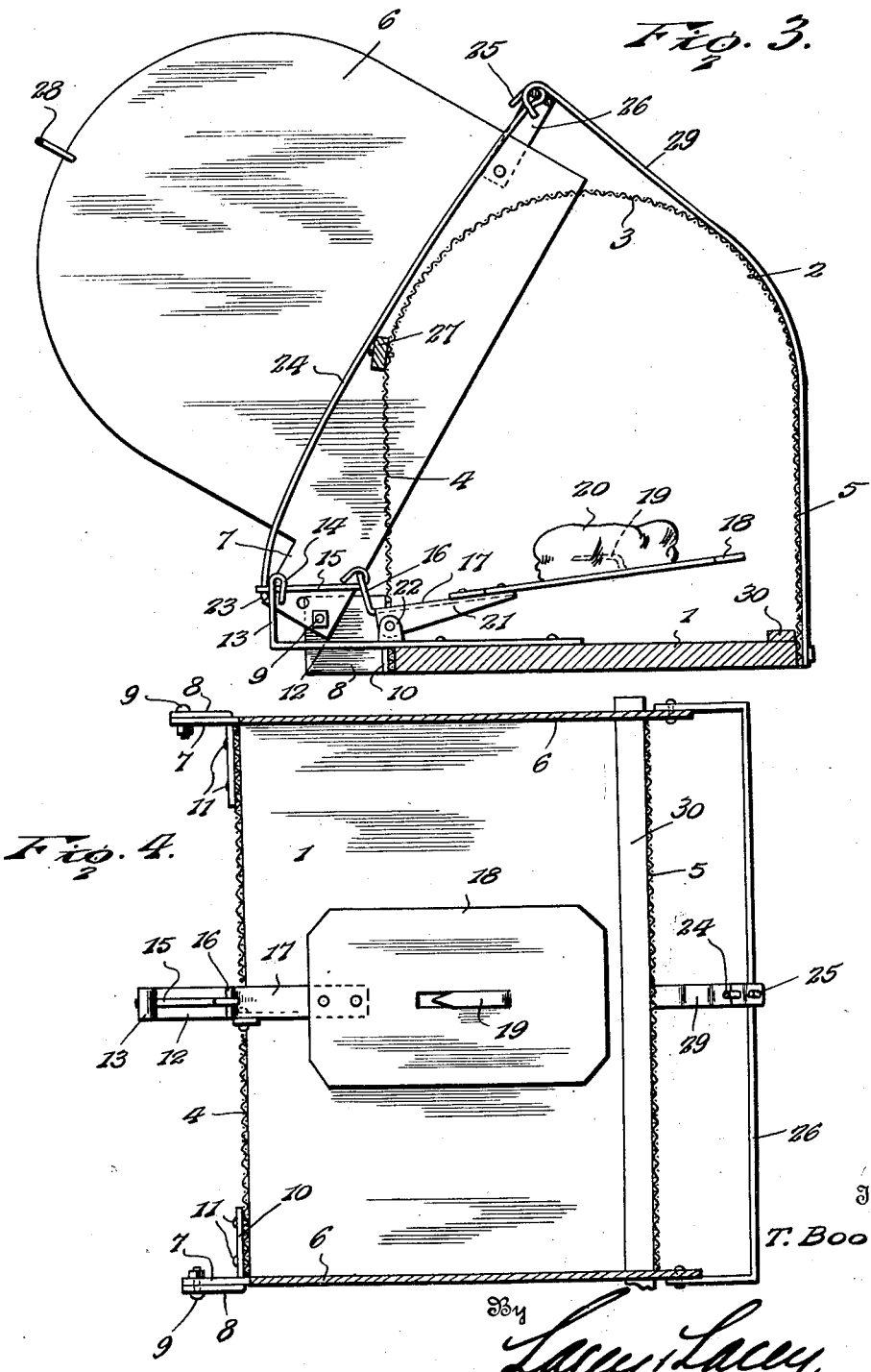

1,837,650

UNITED STATES PATENT OFFICE

THOMAS BOOTH, OF BOISE CITY, IDAHO

ANIMAL TRAP

Application filed December 22, 1930. Serial No. 504,129.

This invention relates to fishing and trapping and more particularly to a trap by means of which fur bearing animals and other animals may be caught and confined while alive.

One object of the invention is to provide a trap of such construction than an animal may be confined in the trap when caught, thereby preventing injury to the animal and also preventing its fur from being damaged and its value as fur reduced.

Another object of the invention is to so form the trap that an animal may enter the body portion thereof from either end and doors for closing the open ends of the body released so that they may move to a closed position when the animal attracted by the bait has entered the trap.

Another object of the invention is to provide improved means for releasably securing the doors in an opened position until a trigger carrying the bait, and disposed within the trap, is moved to release the door securing means and also provide means serving to yieldably resist movement of the doors to an open position and quickly move them towards a closed position when released.

Another object of the invention is to provide a trap of the confining type having a body portion of such construction that an animal may easily see into the body through the walls thereof, thereby increasing likelihood of a timid or suspicious animal entering the trap.

The invention is illustrated in the accompanying drawings wherein

Fig. 1 is a perspective view showing the improved trap with the doors closed,

Fig. 2 is a transverse sectional view through the trap,

Fig. 3 is a view similar to Fig. 2 showing the doors secured in an opened position, and Fig. 4 is a sectional view taken through the trap along the line 4—4 of Fig. 2.

This improved trap of the confining type has a bottom 1 which may be formed of metal or of any other desired material. The top and side walls of the trap are formed from a sheet of wire mesh 2, thereby defining a top 3 and side walls 4 and 5 which are formed integral with each other. The top has been shown curved transversely and merging into the side walls, but it is to be understood that the strip of wire could be bent to form a flat top. In order to close the open ends of the body, there have been provided doors 6 which are formed of strong sheet metal and are of the proper size and dimensions to close the ends of the body. Ears 7 project from the doors near the lower ends thereof and these ears project outwardly beyond the side wall 4 and overlap brackets 8 to which they are pivotally connected by bolts or equivalent fasteners 9. A number of bolt receiving openings may be formed in the ears in order to permit the doors to be adjusted if found necessary. The brackets 8 to which the doors are pivotally connected extend vertically at ends of the wall 4 and near their lower ends are formed with arms 10 which extend transversely from the brackets and are secured against an edge face of the bottom below the wall 4 by nails, screws or equivalent fasteners 11.

In order to releasably secure the doors in an open position, there has been provided a latch, the base strip 12 of which extends through the wall 4 and is firmly secured to the upper face of the bottom 1. One end of the base strip is bent to form an upstanding arm 13 which has its upper end portion bent inwardly and downwardly as shown at 14. Aligned openings are formed through the bent portion of the arm 13 to slidably receive a retainer pin 15. This pin extends longitudinally of the base strip 12 in vertical spaced relation thereto and has its inner end loosely engaged through an opening formed in an ear or lip 16 extending upwardly from a trigger 17 which carries a plate 18 having a tongue 19 struck therefrom so that bait 20 of a suitable character may be held upon the plate. A flange 21 which extends downwardly from a side of the trigger is pivoted to an upstanding ear of a bearing bracket 22 thereby pivotally mounting the trigger so that it may be set as shown in Fig. 3 and pressed downwardly when an animal attempts to remove or eat the bait 20, thereby drawing the pin inwardly until its outer free end is moved out of engagement with a bill 23 formed at the free rear end of a rod 24. This rod has its other end formed with a hook 25 engaged through an opening formed in a yoke 26 connecting the doors and it should be noted that the rod is bent so that it is curved longitudinally as shown in Fig. 2 and may be disposed in the position shown in Fig. 3 and hold the doors open when the trap is set. A block 27 is secured against the rear wall to form a bearing for the rod when in a set position.

A bracing rod or wire 28 connects the upper portions of the doors and overlies the rod 24 when the doors are closed in order to retain this rod in the position shown in Figs. 1 and 2. It is desired to have the doors move quickly towards a closed position when the trigger is pressed downwardly to withdraw the pin and thereby prevent an animal from jumping out through the open ends of the body before the doors close. In order to do so there has been provided an elastic band 29, preferably consisting of a strip of rubber of sufficient width and thickness to prevent it from easily breaking. This elastic band has one end formed with openings to receive the rod 24 and hook 25 thereof and its other end is secured against the edge of the bottom below the wall 5. The rubber band is of such length that it will be stretched and placed under tension when the doors are moved to an open position and its elasticity will cause it to exert pull and quickly move the doors to a closed position when they are released.

A strip 30 has been secured upon the floor close to the wall 5 with its ends projecting from the bottom at the open ends of the body, thereby providing abutments to be engaged by the doors and limited closing movement thereof. This bar or strip 30 may be countersunk in the bottom in order to eliminate space between the bottom and the lower edges of the doors. It will also be obvious that if so desired, abutments formed integral with the bottom and projecting from the ends thereof may take the place of the abutments formed by the extended ends of the strip 30.

When this improved trap is in use, it is set upon the ground and the doors are swung to an open position by grasping the yoke 26 and drawing the same upwardly until the doors are in the position shown in Fig. 3. The retainer rod 24 extends downwardly across the bearing block 27 and its hook or bill 23 is disposed against the outer side face of the arm 13 of the latch. The trigger is then raised from the position shown in Fig. 1 to that of Fig. 3 and this will cause the pin 15 to move outwardly and dispose its free end over the bill of the retainer rod. Therefore the retainer rod will be held in the position shown in Fig. 3 and the doors will remain open.

When an animal approaches the trap, it will be able to easily see and smell the bait as the body is open at its ends and is formed of wire. The animal enters the trap from either end and upon attempting to remove the bait or eat it while still upon the plate 18, the plate and trigger will be pressed downwardly, thereby retracting the pin 15 and releasing the retainer rod. When this happens the elasticity of the band 29 will pull upon the yoke and move the doors towards a closed position. The pull exerted by the elastic band and the weight of the doors and yoke will cause the doors to close very rapidly, thereby preventing the animal from leaping out of the trap and confining it in the trap.

In view of the fact that the animal is confined within the trap and not caught by jaws, it will not be injured nor will its fur be damaged. The owner of the trap can easily kill the animal while confined in the trap and may then raise the doors to remove the dead animal and reset the trap. If so desired the animal may be removed, while alive, from the trap and then killed, or kept alive.

What is claimed is:

1. A confining trap comprising a body open at its ends and having a bottom, a top and side walls, doors for the open ends of said body mounted for swinging movement into and out of a closed position, a yoke connecting said doors, a retainer carried by said yoke, and a latch to engage said retainer and releasably secure the doors open having a trigger disposed within the body and carrying bait holding means.

2. A confining trap comprising a body open at its ends, doors for closing the open ends of said body pivotally mounted adjacent one side of the body, a yoke connecting said doors and extending longitudinally of the body, a latch having a trigger disposed within the body, a retainer rod loosely engaged with said yoke and extending transversely of the body intermediate the ends thereof for engagement by said latch when the doors are open, and means to urge the doors towards a closed position when the latch is moved to release said retainer rod.

3. A confining trap comprising a body open at its ends, doors to close the open ends of the body pivotally mounted at one side thereof, a yoke connecting said doors and extending longitudinally of the body at the opposite side thereof when the doors are closed, a latch having a trigger disposed within said body, a retainer carried by said yoke and extending transversely of said body for engagement by said latch when the doors are opened to releasably hold the doors open, and an elastic element secured to the yoke and body and placed under tension when the doors are swung upwardly to an open position, whereby the elastic element may serve to move the doors to a closed position when the retainer is released from said latch.

4. A confining trap comprising a body open at its ends and having a bottom and a top and side walls, doors for closing the open ends of said body mounted for swinging movement into and out of a closed position, a yoke extending longitudinally of said body externally thereof and having its ends secured to said doors, a latch carried by said bottom with a portion disposed externally of the body and a trigger within the body, a retainer rod loosely engaged with said yoke and extending transversely of the body externally thereof for engagement by the outer portion of said latch to releasably retain the doors in an open position, and an elastic strap having one end secured to said bottom and its other end disposed about said yoke and engaged with said retainer rod, said elastic strap being placed under tension when the doors are moved to an opened position and serving to draw the doors towards a closed position when the latch is moved to release the retainer rod.

5. A confining trap comprising a body open at its ends and having a bottom and side walls and a top wall, bearing brackets carried by said bottom at opposite ends of one side edge thereof, doors pivoted to said brackets and movable vertically into and out of position to close the open ends of the body, a yoke connecting said doors, a retainer rod engaged with said yoke and having a bill at its free end, and a latch consisting of a base secured upon said bottom and projecting outwardly through one side wall of the body, an upstanding arm at the outer end of said base, a trigger pivotally connected with said base and extending inwardly of said body, and a pin loosely connected with said trigger and extending outwardly therefrom with its free end portion slidably engaged through the arm at the outer end of the base and adapted to engage the bill of said retainer rod and releasably secure the doors in an open position.

6. A confining trap comprising a body open at its ends, doors to close the open ends of said body pivotally mounted at one side of the body, a yoke connecting said doors at the other side of the body, a bracing rod connecting said doors, a retainer rod engaged with said yoke intermediate the ends thereof and extending across the body beneath said bracing rod, and a latch to engage said retainer rod and releasably secure the doors in an opposite position carried by said body and having a trigger disposed within the body.

7. A confining trap comprising a body, a door for said body, a retainer rod connected with said door, and a latch to releasably secure the door in an open position having a base strip formed with an upstanding arm at one end, a bearing bracket carried by the base strip, a trigger pivoted to said bearing bracket, an ear adjacent the pivoted end of said trigger, a pin loosely connected with said ear and having its free end portion slidably engaged through said arm and adapted to engage said retainer rod to hold the door in an open position, and a bait holder carried by the free end portion of said trigger whereby the trigger may be moved to draw upon said pin and release said retainer rod for closing of the door.

8. A confining trap comprising a body open at its ends, doors to close the open ends of said body pivotally mounted and connected to move simultaneously into open and closed positions, a latch having a trigger disposed within said body, a retainer engageable by said latch to releasably hold the doors in an open position, and means to urge the doors towards a closed position when the retainer is released from said latch.

In testimony whereof I affix my signature.

THOMAS BOOTH. [L. S.]